(12) United States Patent
Kang

(10) Patent No.: US 7,340,242 B2
(45) Date of Patent: Mar. 4, 2008

(54) METHOD FOR MEASURING SERVICE DATA AMOUNT OF TERMINAL

(75) Inventor: Jong-Kook Kang, Gyonggi-Do (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 10/619,550

(22) Filed: Jul. 16, 2003

(65) Prior Publication Data

US 2004/0098477 A1    May 20, 2004

(30) Foreign Application Priority Data

Jul. 18, 2002    (KR)    ............. 10-2002-0042073

(51) Int. Cl.
*H04M 11/00*    (2006.01)
*H04M 1/00*    (2006.01)
*H04B 1/38*    (2006.01)
*G01R 31/08*    (2006.01)

(52) U.S. Cl. ............... 455/405; 455/407; 455/557; 370/253

(58) Field of Classification Search ........... 455/405, 455/407, 557; 370/253
See application file for complete search history.

(56) References Cited

U.S. PATENT DOCUMENTS 5,678,229 A * 10/1997 Seki et al. ............... 455/572
6,311,054 B1 * 10/2001 Korpela ................... 455/406
6,493,547 B1 * 12/2002 Raith ....................... 455/405
6,973,088 B2 * 12/2005 Kuzhiyil et al. ......... 370/395.2
2001/0038625 A1 * 11/2001 Satoh ....................... 370/352
2002/0002470 A1 *  1/2002 Arai ........................... 705/1
2003/0065767 A1 *  4/2003 Pardhy et al. ............ 709/224
2004/0037287 A1 *  2/2004 Jeong ....................... 370/394

FOREIGN PATENT DOCUMENTS

JP    2001326635 A  * 11/2001
WO   WO 00/70860 A1    11/2000
WO   WO 02/39671 A2  *  5/2002

OTHER PUBLICATIONS

Chinese Office Action dated Jun. 23, 2006.

* cited by examiner

*Primary Examiner*—William Trost
*Assistant Examiner*—Marivelisse Santiago-Cordero
(74) *Attorney, Agent, or Firm*—Ked & Associates, LLP

(57) ABSTRACT

A method for measuring a service data amount of a terminal in a call connection networking between a TE and a network, in which an amount of provided data is measured and displayed on a screen. Because information on the amount of data provided for service is provided to a data service user, the user can estimate a corresponding billing amount and thus the data service can be more effectively used in terms of cost.

11 Claims, 4 Drawing Sheets

METHOD FOR MEASURING SERVICE DATA AMOUNT OF TERMINAL

BACKGROUND OF THE INVENTION

1. Field of the Invention

The present invention relates to a data communication service and, more particularly, to a data communication service using a call connection networking.

2. Description of the Background Art

First- and second-generation mobile communication provides voice-centered service, while the third-generation provides various types of services such as a data service and a multimedia service as well as voice service, for which communication service providers adjust a billing system and a billing reference to the changing service environment.

With the billing system changing, a billing amount of the voice service is calculated depending on service use time, and a billing amount of the data service is calculated depending on a provided data amount (referred to as 'the number of packets', hereinafter).

In general, a radio data service is provided in such manner that information of a network server is directly downloaded to a mobile communication terminal or that information of the network server is downloaded to a terminal equipment (TE) such as a personal computer (PC) or a notebook computer. In the second manner, the mobile communication terminal is simply functioned as a modem.

FIG. 1 shows information displayed on a screen of a terminal when a call connection networking is performed in accordance with a conventional art.

As shown in FIG. 1, with the conventional mobile communication terminal, only a connection time (or a call time) of a corresponding service is displayed regardless of types of services (e.g., a call service, a data service or a multimedia service).

FIG. 2 illustrates a call connection networking procedure using the mobile communication terminal.

As shown in FIG. 2, the TE (Terminal Equipment), referring to the personal computer (PC) or a notebook computer, includes a screen easily recognizably by a user and a manipulation-easy device. A mobile terminal (MT) signifies a mobile communication terminal and serves as a modem of the TE.

When the TE intends to download desired information or data from a specific server, it attempts a connection to the MT 20 (step S1).

When the TE 10 and the MT 20 are connected, the TE 10 transfers a data service start request message to the MT 20 (step S2).

Upon receiving the start request message from the TE 10, the MT 20 sets a channel to a packet data serving node (PDSN) 30 or an inter-working function (IWF) (step S3).

As the channel is set, the MT 20 transfers a service activation message to the TE 10. Upon receiving the service activation message, the TE 10 starts uploading and downloading of data from the PDSN 30 (step S4).

When the data transmission is completed and the data service is terminated, the TE 10 transfers a service termination request message to the MT 20 (step S5).

Then, the MT 20 releases the set channel to the PDSN 30 (step S6) and transfers a non-activation message on the data service to the TE 10.

Upon receiving the data service non-activation message, the TE transfers a connection release request message to the MT 20 to release connection to the MT 20 (step S7).

In case of the voice service, a communication provider calculates duration (that is, a communication channel occupancy time) from the point when the communication channel was set between the MT 20 and the PDSN 30 to the point of releasing of the communication channel, and estimates a billing amount according to the calculated time.

Meanwhile, in the case of the data service, the communication provider calculates the number of packets from the point when the communication channel was set between the MT 20 and the PDSN 30 to the point of releasing of the communication channel, and estimates a billing amount according to the calculated number of packets.

However, in the conventional art, all the information the MT provides to a user is merely the call time (or the connection time) as information for the billing amount estimation or on the service use amount. This makes the user totally dependent on the information of the communication provider as far as concerned the billing amount of the data service.

The above references are incorporated by reference herein where appropriate for appropriate teachings of additional or alternative details, features and/or technical background.

SUMMARY OF THE INVENTION

Therefore, an object of the present invention is to provide a method for measuring a service data amount of a terminal capable of measuring an amount of provided data and providing the measured amount to a user, when a terminal equipment (TE) performs a data communication service by using a call connection networking function.

To achieve at least the above objects in whole or in parts, there is provided a method for measuring a service data amount of a terminal in a call connection networking between a TE and a network, in which a an amount of provided data is measured and displayed on a screen.

Preferably, the data is a payload of a transmission control protocol layer.

Preferably, measurement of the data amount is performed from a point when the transmission control protocol is set to a point when every protocol session of the TE is terminated.

Preferably, the terminal operates as a modem of the TE.

To achieve at least these advantages in whole or in parts, there is further provided a method for measuring a service data amount in a call connection networking between a terminal equipment (TE) and a network, including: measuring an amount of provided data when a channel for data transmission is set between the TE and the network; and displaying the measured amount of data on a screen of a terminal.

Preferably, measurement of the amount of provided data is performed by the terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
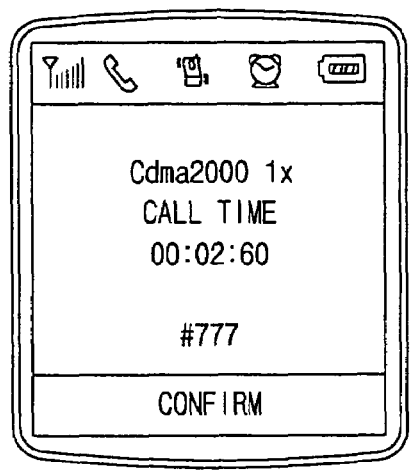
FIG. 1 shows information displayed on a screen of a terminal in accordance with a conventional art.
Figure 2:
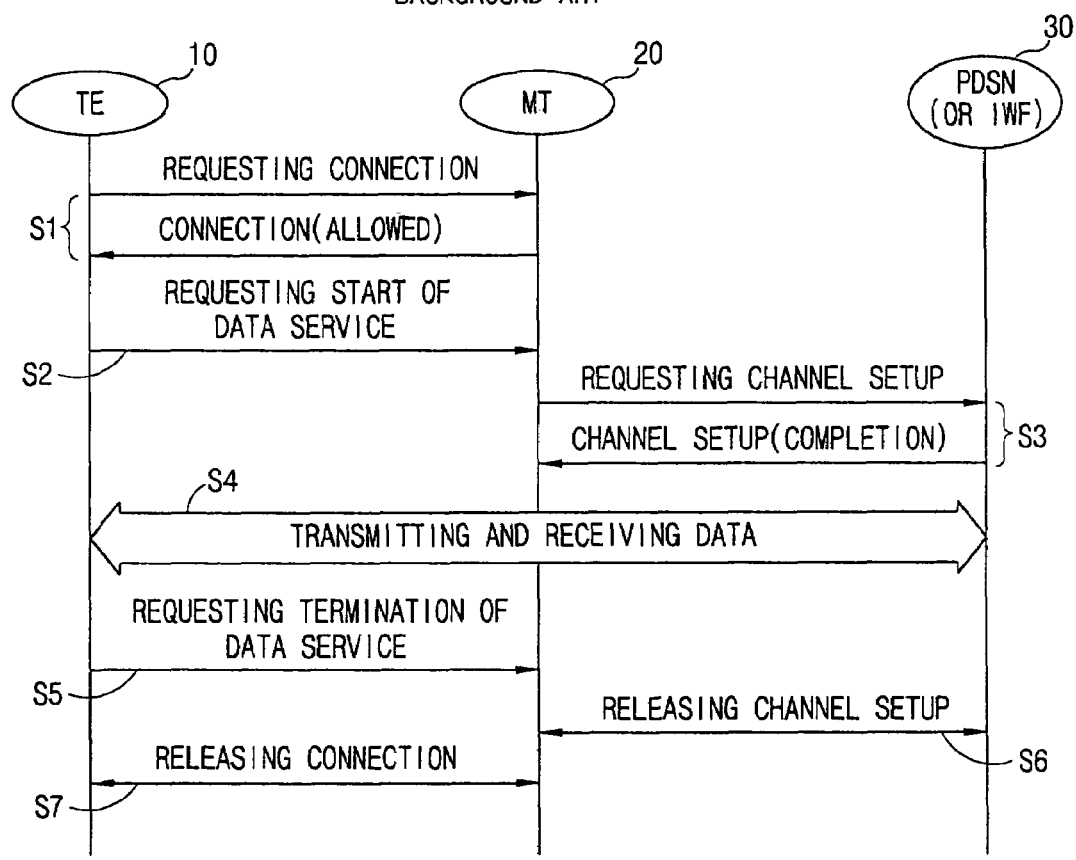
FIG. 2 illustrates a call connection networking procedure using a mobile communication terminal.
Figure 3:
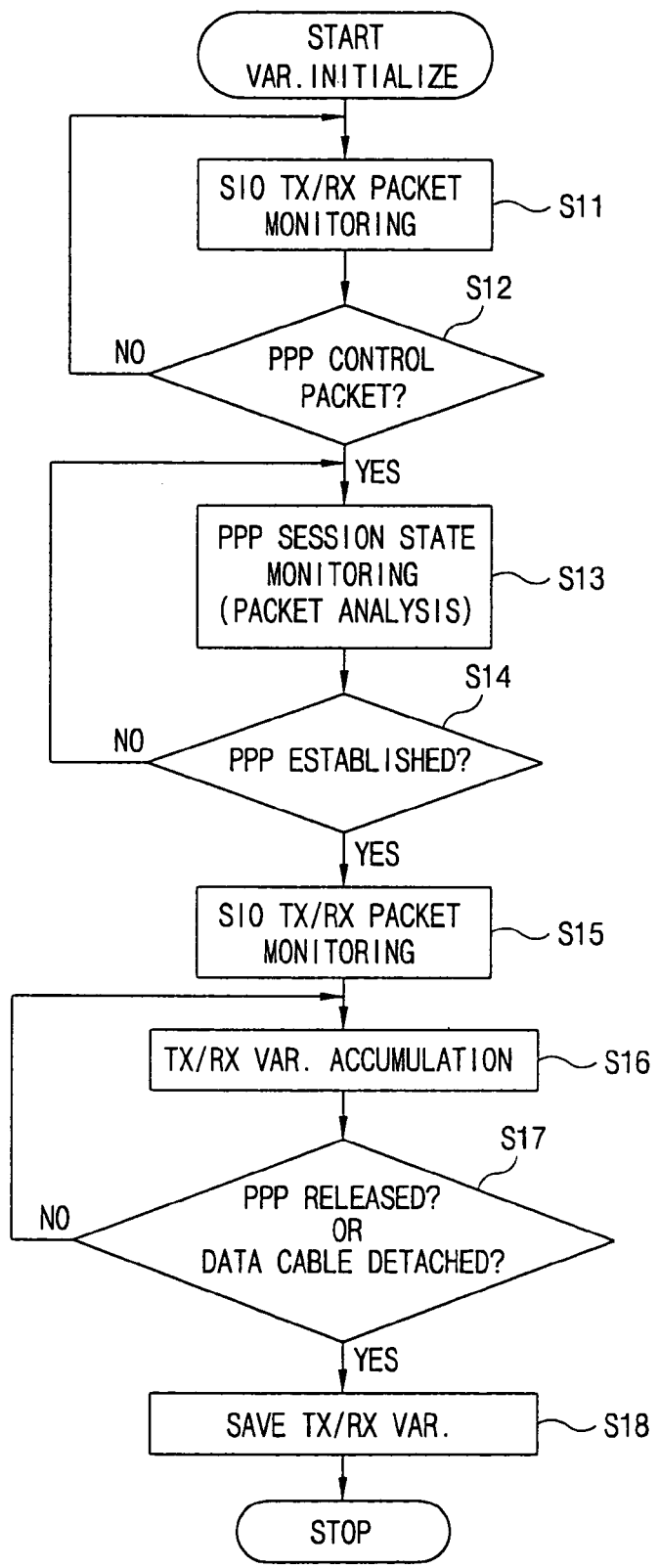
FIG. 3 is a flow chart of a method for measuring the number of packets in accordance with a preferred embodiment of the present invention.

FIG. 3 is a flow chart of a method for measuring the number of packets in accordance with a preferred embodiment of the present invention, showing a packet number measuring procedure performed by the MT after a channel for data transmission is set between the TE and a network.

As shown in FIG. 3, the packet number measuring procedure in accordance with the present invention includes: a step (S11) in which a Service Information Twin Ocfet (SIO) packet is monitored to check whether there is a PPP control packet; steps (S12 and S13) in which if there is a Point to Point Protocol control packet, the packet is analyzed to check whether a TCP setup state of the TE 10 is 'PPP ESTABLISHED'; steps (S14~S16) in which if the TCP setup state of the TE 10 is 'PPP ESTABLISHED', all the packets transmitted and received until every protocol session of the TE is terminated or until a data cable is detached are cumulatively calculated; and steps (S17 and S18) in which when every protocol session of the TE is terminated or when the data cable is detached, the packet accumulated information is classified into transmission packet accumulated information and reception packet accumulated information and stored in a memory.

The data substantially provided to the user (referred to as 'effective packet') refers to a data excluding a data (or signal) added during a protocol stack setting process, that is, a process of setting a session of TCP/IP/PPP.

Checking the start time point and termination time point of measuring the effect packet is a crucial factor to count effective packets and calculate a statistics value.

While the call connection network is being performed, the MT can not check contents of every protocol. Thus, while monitoring packets (SIO TX/RX packets) transmitted to and received from a data communication cable, the MT 20 initiates measurement of effective packets when the TCP setup state of the TE 10 is 'PPP ESTABLISHED'.

Figure 4:
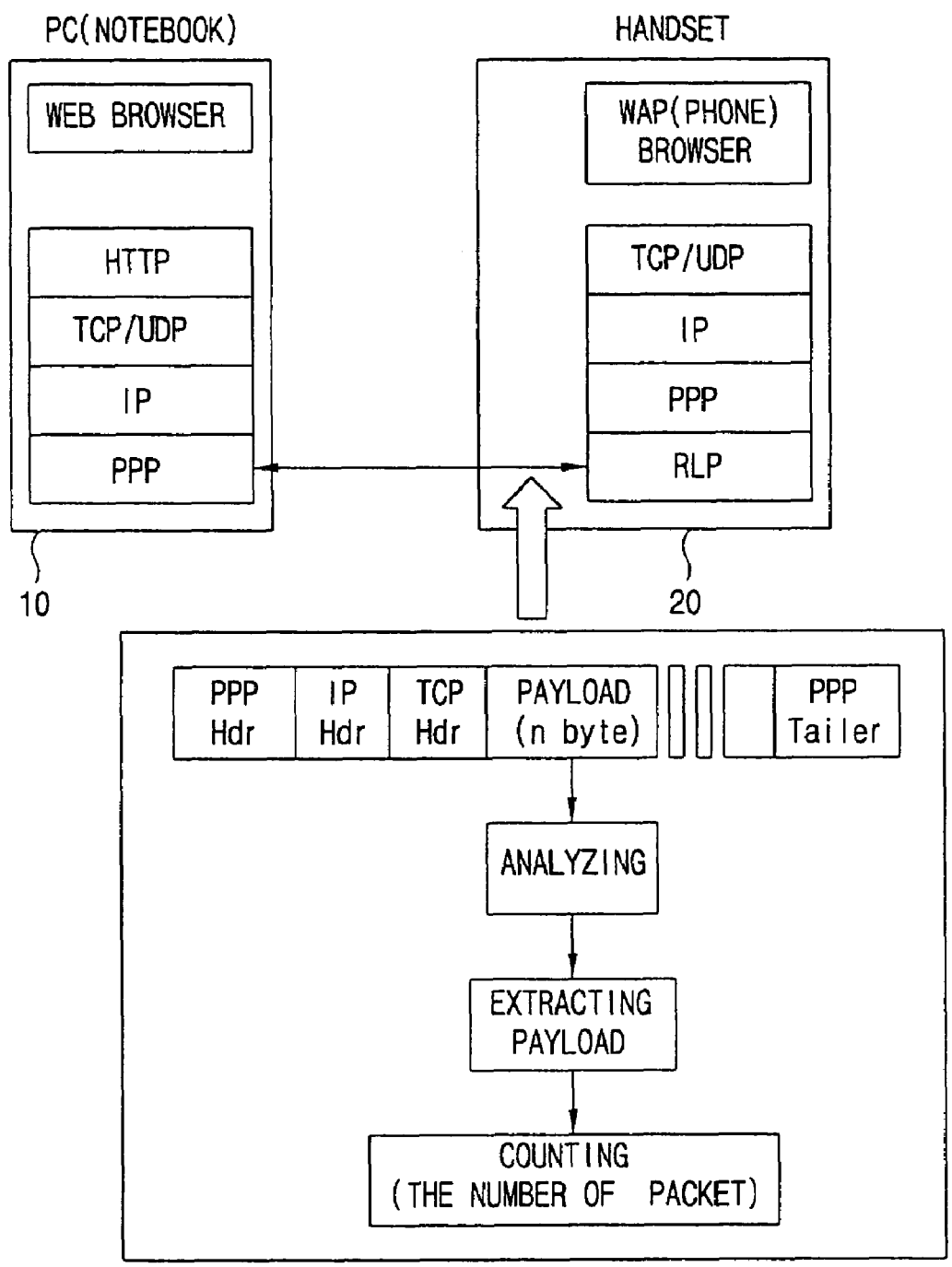
FIG. 4 illustrates a connection structure between a TE (Terminal Equipment) and an MT (Mobile Terminal) and a protocol stack in accordance with the preferred embodiment of the present invention.

FIG. 4 illustrates a connection structure between a TE (Terminal Equipment) and an MT (Mobile Terminal) and a protocol stack in accordance with the preferred embodiment of the present invention.

The preferred embodiment of the present invention will now be described with reference to FIGS. 3 and 4.

When the TE 10 and the MT 20 are connected, the MT 20 monitors packets (referred to as 'SIO packets', hereinafter) transmitted to and received from the data communication cable.

When a 'PPP control packet' is found among SIO packets, the MT 20 analyzes the packet and checks whether TCP setup state of the TE 10 is 'PPP ESTABLISHED'.

If the TCP setup state of the TE 10 is 'PPP ESTABLISHED', the MT 20 sets an 'enable' value as a state value indicating a start point of effective packet measurement. And then, the MT 20 performs an effective packet separation to extract a user data from effective packets.

The effective packet separation is performed through a procedure defined at protocols of each layer. That is, the MT 20 separates a header and a tailer generated at a PPP layer and a TCP/IP layer to extract a user data.

First, the MT 20 obtains information on setup of PPP session between the TE 10 and a network through a generally performed PPP unframed, and then, checks a TCP/IP header compression information in order to use it as control information when extracting TCP/IP header information.

Thereafter, the MT 20 separates a TCP/IP packet, a payload of the PPP layer and then separates the header and the tailer of the IP layer and the TCP layer, thereby extracting a user data.

As the user data is extracted, the MT 20 calculates how many packets the size of the extracted data corresponds to. In this respect, before the calculation, the packet size should be defined first. The number of bytes corresponding to 1 packet may differ a bit by service providers. For example, if 1 packet is 512 byte, a value obtained by dividing a user data by 512 is the number of provided packets.

While the state variable is set 'enable', the MT 20 classifies the transmission and reception packets of the TE 10 into the number of transmitted packets and the number of received packets to separately, cumulatively calculate them, and then outputs the packet accumulation information on the screen. The packet accumulation information outputted on the screen is updated periodically according to the provider's request.

When a specific user, who has occupied a channel, does not transmit or receive data temporarily, the networking system hands over authorization on the channel to a different user. This is called a dormant function.

While the MT 20 is dormant, the state variable is set to 'disable' and the packet accumulative calculation operation of the MT 20 is temporarily suspended. Therefore, the packet accumulative calculation operation of the MT 20 is not terminated until every protocol session of the TE 10 is terminated (PPP RELEASED) or connection of the data cable is detached. The counted cumulative information of the transmitted and received packets is stored in a non-volatile memory of the MT 20.

When the accumulative information on the number of transmitted and received packets is initialized, the next updated accumulative information on the number of packets is stored in the non-volatile memory of the MT 20 by discriminating transmitted packets, received packets and the total packets. Then, the user can check various packet accumulative information by a search function through a user interface.

In addition, the user can delete or initialize the stored packet accumulative information through the user interface function, and in this case, deletion and initialization are performed by discriminating a transmitted packet and a received packet.

Figure 5:
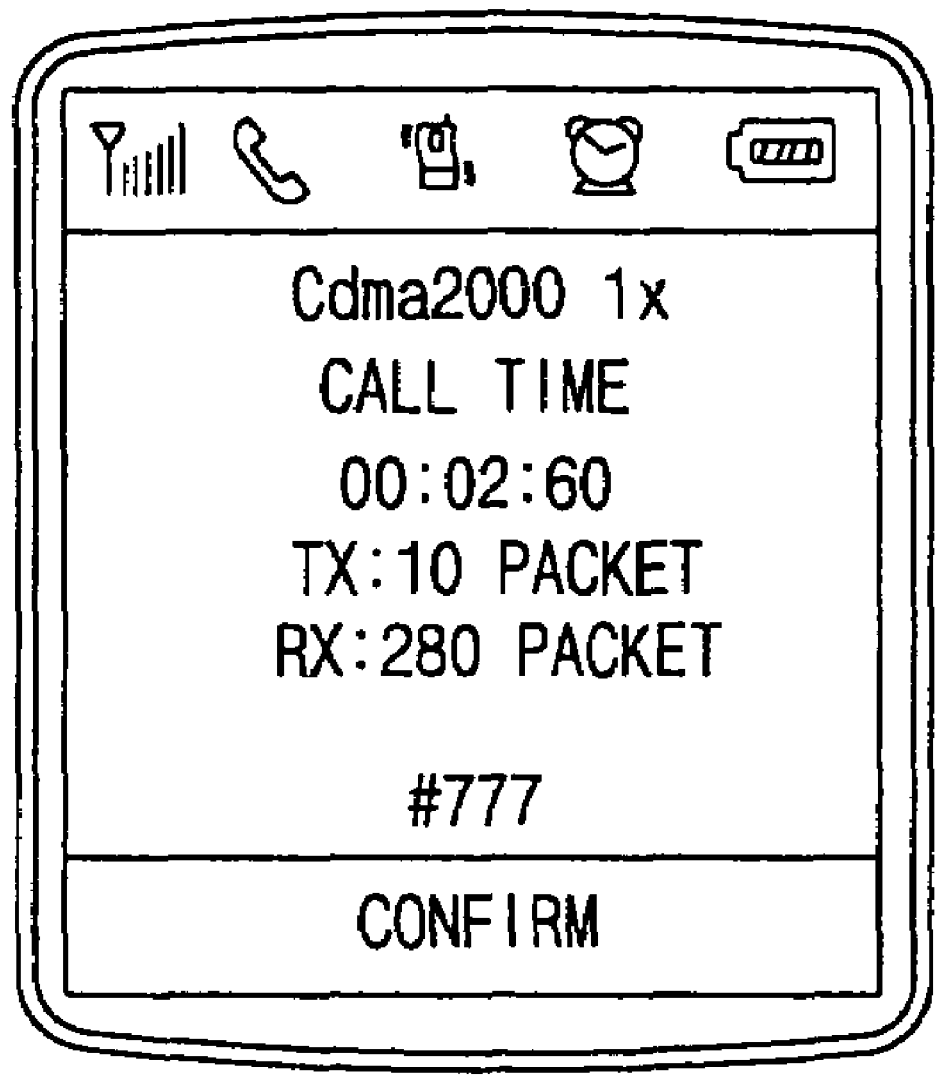
FIG. 5 shows information displayed on a screen of a terminal in accordance with the preferred embodiment of the present invention.

FIG. 5 shows information displayed on a screen of a terminal in accordance with the preferred embodiment of the present invention.

As shown in FIG. 5, the mobile communication terminal outputs the accumulation information on the amount of transmitted packets and the amount of received packets and a connection time on its screen.

As so far described, the method for measuring a service data amount of a terminal has the following advantage.

That is, because the information on the amount of data provided for service is provided to a data service user, the user can estimate a corresponding billing amount, and thus, the data service can be more effectively used in terms of cost.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for measuring by a terminal a service data amount received or transmitted at a terminal equipment (TE) comprising:
    monitoring at a mobile communications terminal, packets received or transmitted between a terminal equipment (TE) and a network to determine when a monitored received or transmitted packet corresponds to a Point-to-Point Protocol (PPP) control packet;
    determining at the mobile communications terminal whether a control protocol setup state of the TE is established when the monitored received or transmitted packet corresponds to the PPP control packet;
    in response to the mobile communications terminal determining that the setup state of the TE is established, cumulatively counting at the mobile communications terminal a number of all packets, excluding packets added during a protocol stack setting process, received or transmitted until every protocol session of the TE is released, wherein the determining of the TE being established indicates a start point of the cumulatively counting, the counting allowing the mobile communications terminal to determine a service data amount received or transmitted at the TE; and
    displaying the number of counted packets on a display of the mobile communications terminal, the counted packets displayed on the terminal including only data in a payload of a transmission control protocol layer,
    wherein the monitoring and the counting are performed by the mobile communications terminal during a call connection networking between the TE and the network.

2. The method of claim 1, wherein the mobile communications terminal operates as a modem of the TE.

3. The method of claim 1, further comprising storing the number of counted packets in a non-volatile memory of the mobile communications terminal, and allowing a user to delete or initialize the number of counted packets via a user interface.

4. The method of claim 3, wherein the user searches the stored number of counted packets by a search function through the user interface.

5. A method for measuring a service data amount in a call connection networking between a terminal equipment (TE) and a network, comprising:
    determining at a mobile communications terminal when a received packet or a transmitted packet between the TE and the network corresponds to a Point-to-Point (PPP) control packet;
    determining at the mobile communications terminal that a control protocol setup state of the TE is established in direct response to the determination that the received packet or the monitored packet corresponds to a PPP control packet;
    starting with the determination that the TE is established, measuring at the mobile communications terminal an amount of provided data between the TE and the network; and
    displaying the measured amount of data on a screen of the terminal,
    wherein the monitoring and the measuring are performed by the mobile communications terminal during a call connection networking between the TE and the network, and
    wherein measuring the amount of provided data comprises:
    removing a header and tailer from said packets received or transmitted between the TE and the network such that the measured amount of provided data corresponds only to the payload portions of the packets; and
    counting a number of received or transmitted payload portions as the measured amount of data, and
    wherein the measurement of the data amount is performed starting from a point when the TE is determined to be established to a point when every protocol session of the TE is terminated.

6. The method of claim 5, wherein the payload portions comprise a payload of a transmission control protocol layer.

7. The method of claim 5, wherein the mobile communication terminal operates as a modem of the TE.

8. A method for measuring a service data amount using a mobile communications terminal in a call connection networking between a terminal equipment (TE) and a network, comprising:
    determining, by the mobile communications terminal, when a received or transmitted packet corresponds to a Point-to-Point Protocol (PPP) control packet;
    when the mobile communications terminal determines the PPP control packet, specifically identifying that a control protocol setup state of the TE is established;
    upon specific identification that the setup state of the TE is established, starting to count by the mobile communications terminal only payload portions of packets received or transmitted between the TE and the network, wherein the specific identification that the setup state of the TE is established indicates a starting point of the counting, the counting allowing the mobile communications terminal to identify a service data amount received or transmitted at the TE; and
    displaying, on the mobile communications terminal, the number of counted received and transmitted payload portions when the protocol setup state of the TE is released,
    wherein the determining and the counting are performed by the mobile communications terminal during a call connection networking between the TE and the network.

9. The method of claim 8, wherein the mobile communications terminal functions as a modem of the TE.

10. The method of claim 8, further comprising storing the number of counted packets in a non-volatile memory of the mobile communications terminal, and allowing a user to delete or initialize the number of counted packets via user interface.

11. The method of claim 10, wherein the user searches the stored number of counted packets by a search function through a user interface included with the mobile communications terminal.

* * * * *